May 2, 1950  L. G. LEYDA  2,506,370
SIGNAL ATTACHMENT FOR FISHING POLES
Filed July 6, 1948
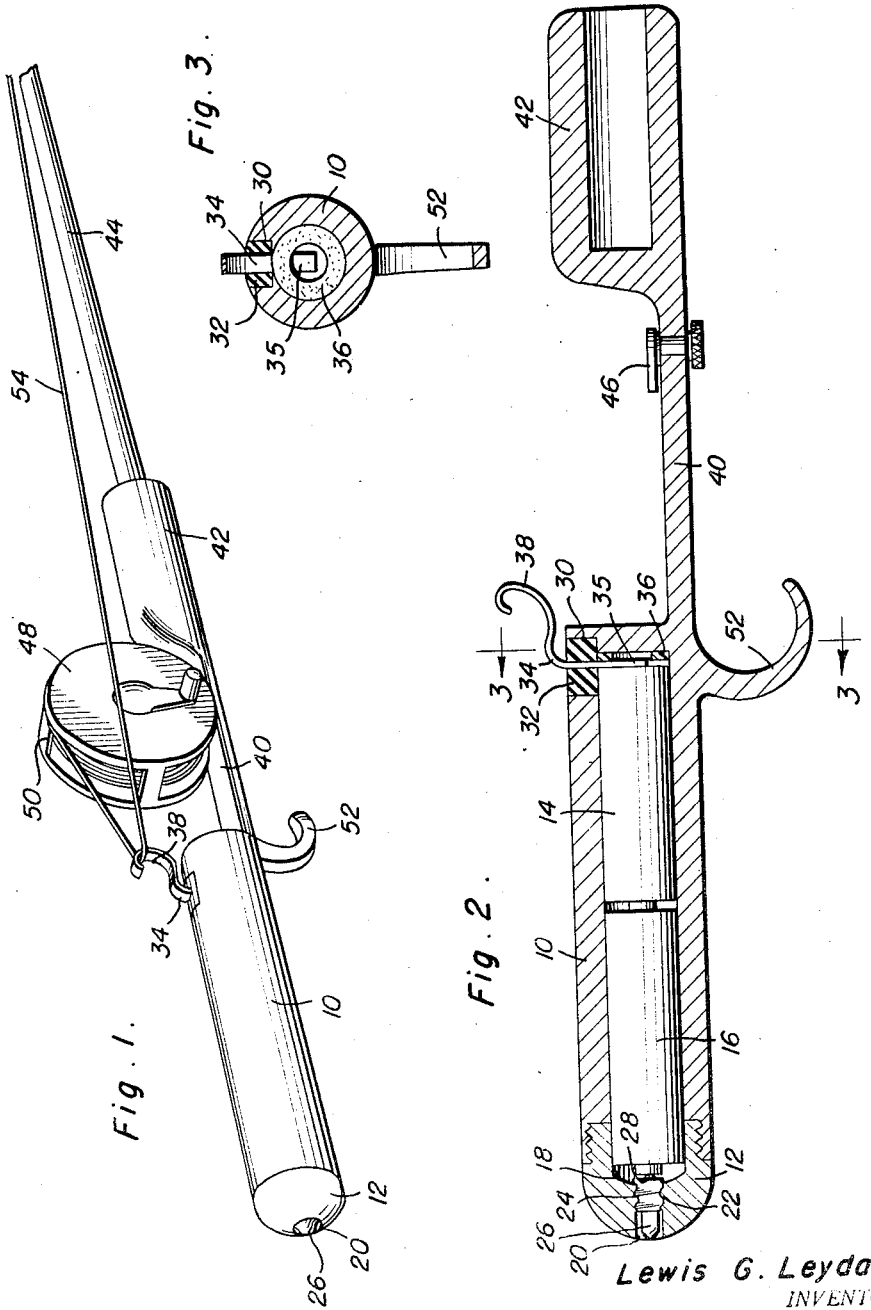
Lewis G. Leyda
INVENTOR.
BY Clarence A. O'Brien
and Harvey B. Jacobson
Attorneys Patented May 2, 1950

2,506,370

UNITED STATES PATENT OFFICE 2,506,370

SIGNAL ATTACHMENT FOR FISHING POLES

Lewis G. Leyda, Charleroi, Pa.

Application July 6, 1948, Serial No. 37,237

2 Claims. (Cl. 43—17)

This invention relates to new and useful improvements in signal devices and more particularly to signal attachments for fishing poles.

The primary object of the present invention is to provide a signal device for night fishing that will become actuated as a fish bites the line connected to the same, to indicate to the user that a fish has been engaged with the line.

Another important object of the present invention is to provide a handle including a signal mechanism that is quickly and readily incorporated with a fishing pole and which is provided with novel and improved means for retaining a reel in position thereon.

A further object of the present invention is to provide a fishing signal wherein all elements are quickly and conveniently disassembled for inspection and repair of parts.

A further aim of the present invention is to provide a signal attachment for fishing poles, that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which—

Figure 1 is a perspective view of the present invention, and showing a reel and line applied thereto in position for use;

Figure 2 is a longitudinal vertical sectional view of the present invention taken substantially through the center of Figure 1, and showing the reel and line removed therefrom; and, Figure 3 is a transverse vertical sectional view taken substantially on the plane of section line 3—3 of Figure 2.

Referring now to the drawing in detail, wherein for the purpose of illustration, there is disclosed a preferred embodiment of the present invention, the numeral 10 represents a preferably cylindrical housing or handle of conductive material open at one end and provided with internal threads at its open end to receivably engage the externally threaded portion of a closure cap 12.

Mounted within the housing 10, is a pair of batteries 14 and 16 which are arranged so that the terminal of the battery 14 will engage the base of the battery 16. The closure cap 12 is provided with a recess 18 in its inner portion that receives a portion of the battery 16.

An axial bore 20 having internal threads 22 is provided in the cap 12 and receivably engages the externally threaded portion 24 of a lamp or bulb 26 that is housed in the bore and which includes a contact tip 28 that engages the terminal of the battery 16.

Suitably fixed in an aperture 30 provided in the handle 10, is an insulated disk or plug 32 that supports the central portion of a conductive member 34.

One end 35 of the member 34 extends into the handle 10 and is interposed between the base of the battery 14 and an insulated washer or plate 36 fixed in the handle 10. The remaining or outer end of the member 34 is bent to form a hook or loop 38 for a purpose which will later be more fully apparent.

Integrally formed with the handle 10, at the closed end thereof, is an elongated extension 40 that terminates in a socket 42 which will engage the inner end of a fishing pole 44.

An adjustable holding clamp 46 of any suitable type, is supported by the extension 40 and will engage a portion of a reel 48, preferably a cross piece 50 thereof, to retain the reel 48 relative to the extension.

An arcuate finger grip 52 is integrally formed with the handle 10 and facilitates a convenient handling of the present invention.

In practical use of the present invention, the loop 38 is normally spaced from the handle 10 thus the batteries 14 and 16 are not grounded and the lamp 26 will not be illuminated.

The fishing line 54 is engaged with the loop 38 after the line has been cast and the handle is supported by any suitable means.

When a pressure is applied to the line 54, by a fish or the like, the loop 38 will bear upon the handle 10 thus grounding the batteries 14 and 16 and illuminating the lamp 26 to indicate to user that a fish has struck the line.

Obviously, the member 34 is of such resiliency that it will return to its normal position, spaced from the handle, after the fish has been pulled in and the same is strong enough to assume the weight and pull of a fish without breaking or bending.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a fishing rod handle having an elongated hollow portion including forward and rear ends, a lamp at the rear end of said portion, a battery received in said portion and having a terminal contacting the lamp, said portion having an opening at its forward end, an insulated plug fixed in said opening, an elongated resilient member extending through said plug and having inner and outer end portions, the inner end portion of said member bearing against the base of said battery, and a line receiving hook at the outer end portion of said member for engaging the hollow portion to complete a circuit to the lamp.

2. In a fishing rod handle including an elongated, hollow, cylindrical portion having forward and rear ends, a lamp mounted in the rear end of said portion, a battery positioned in said portion and having a terminal contacting the lamp, a wall closing the forward end of said portion, an insulated washer disposed between the base of said battery and said wall, said battery being insulated from said portion, said portion having an opening therein at its rear end, an insulated plug fixed in said opening, an elongated resilient switch member extending through said plug and having inner and outer end portions, the inner end portion of said member being disposed laterally of said battery and interposed between said battery and said washer to bear against the base of said battery, and a line receiving hook at the outer end portion of said member and spaced from said portion, said hook being flexed to contact the portion and complete a circuit to said lamp.

LEWIS G. LEYDA.

REFERENCES CITED

The following references are of record in the file of this patent:

UNITED STATES PATENTS

| Number | Name | Date |
|---|---|---|
| 2,196,784 | Simmons et al. | Apr. 9, 1940 |
| 2,349,077 | Comparelli | May 16, 1944 |
| 2,409,988 | Schwebs | Oct. 22, 1946 |